March 15, 1966 KATSUYA ATSUMI 3,240,079
SPEED CHANGE MECHANISMS IN MAGNETIC TAPE RECORDERS
Filed Dec. 19, 1963 4 Sheets-Sheet 1
FIG. 1
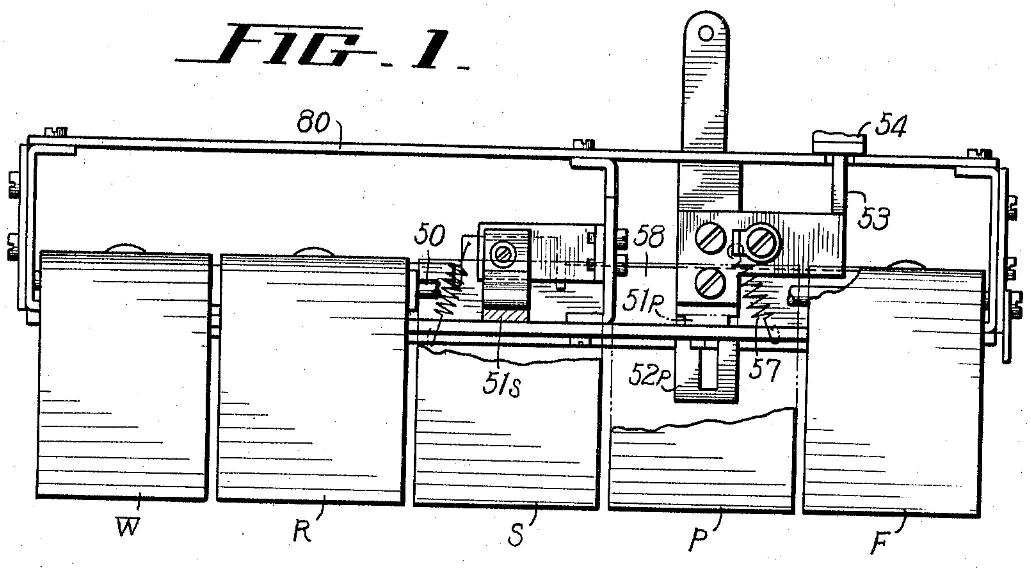
FIG. 3 FIG. 2
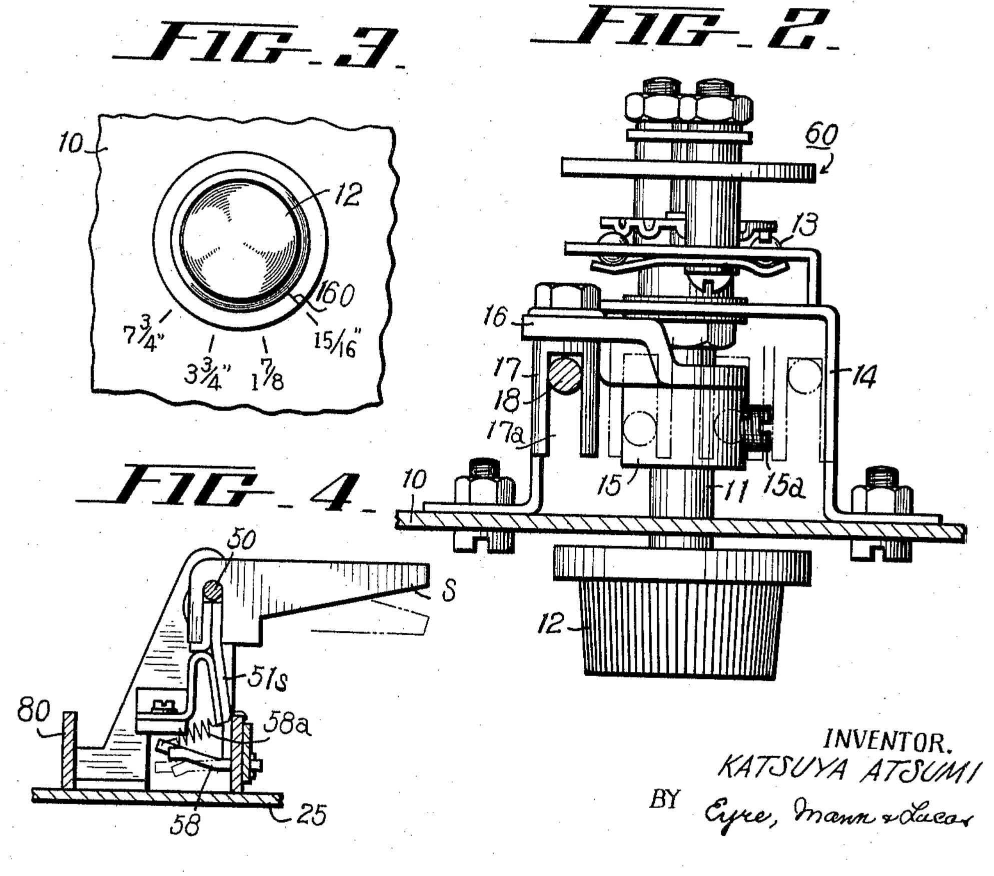
FIG. 3, FIG. 2, FIG. 4
INVENTOR.
KATSUYA ATSUMI
BY Eyre, Mann & Lucas INVENTOR
KATSUYA ATSUMI
BY Eyre, Mann & Lucas March 15, 1966 KATSUYA ATSUMI 3,240,079

SPEED CHANGE MECHANISMS IN MAGNETIC TAPE RECORDERS

Filed Dec. 19, 1963 4 Sheets-Sheet 3

INVENTOR.
KATSUYA ATSUMI
BY Eyre, Mann, & Lucas

INVENTOR.
KATSUYA ATSUMI
BY Eyre, Mann & Lucas

United States Patent Office 3,240,079
Patented Mar. 15, 1966

3,240,079

SPEED CHANGE MECHANISMS IN MAGNETIC TAPE RECORDERS

Katsuya Atsumi, Kohjiya-cho, Ohta-ku, Tokyo, Japan, assignor to Akai Electric Company, Limited, a corporation of Japan Filed Dec. 19, 1963, Ser. No. 331,651
5 Claims. (Cl. 74—207)

This invention relates generally to speed change mechanisms in magnetic tape recording and playback machines for varying the tape drive speed.

According to a conventional technique, this kind of machine is provided with a stepped cone for increasing the number of change speed steps to four or more. The stepped cone is generally supported by a spring-loaded and three-dimensionally pivoted elongated bar preferably at its intermediate position.

A considerable difficulty met with this kind of tape speed change mechanism is that inherent in the way of control of the mechanism. Most of all these conventional mechanisms employ a control lever which is however highly difficult to manipulate because of its inherent design so as to follow a zig-zag guide passage somewhat similar to that of the automotive gear change lever or that fitted on a lathe.

The main object of the invention is to provide a speed change mechanism in the tape recorder employing a stepped cone as the main working part of the mechanism which is however capable of being easily controlled only by turning a control knob and by depressing a playing push button.

An object is to provide a mechanism of the character above referred to wherein the said knob mechanically cooperates with a rotary means for controlling simultaneously the circuit of a conventional equalizer.

These and other objects and advantages may be readily ascertained by referring to the following description and illustration in which:

FIG. 1 represents a fragmentally broken-away top plan view of a series of push buttons on a magnetic tape recording and reproducing machine, hereinafter referred to briefly as "tape recorder," embodying a tape speed selector mechanism as constructed in accordance with the novel teaching of the instant invention;

FIG. 2 is a top plan view of a speed selector knob and its several related parts which knob is rotatably mounted in the front wall, shown in section, of the chassis of the tape recorder and below the said series of buttons with the top panel of the chassis omitted for the purpose of simplifying the drawing;

FIG. 3 is a front view of the knob;

FIG. 4 is a side view of one of the aforementioned buttons destined for "STOP"-control of the tape drive and its related parts wherein however a substantial part thereof is shown in section;

Figure 5A:
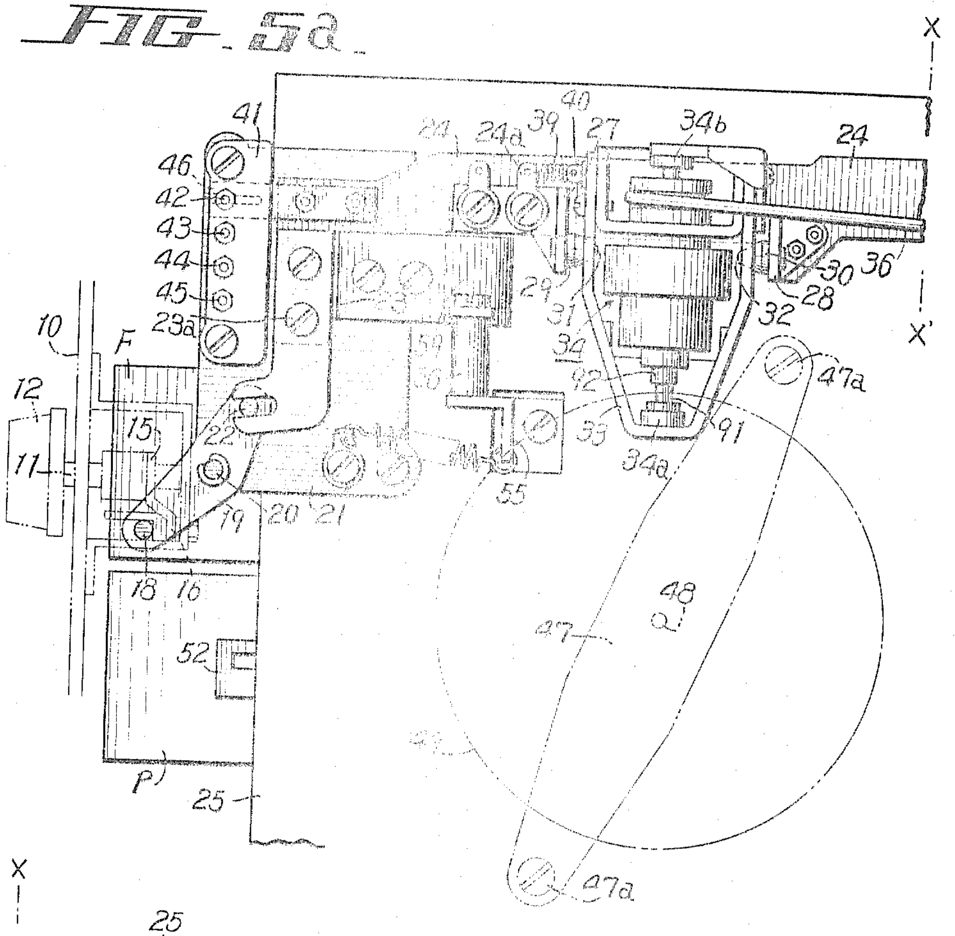
Figure 5B:
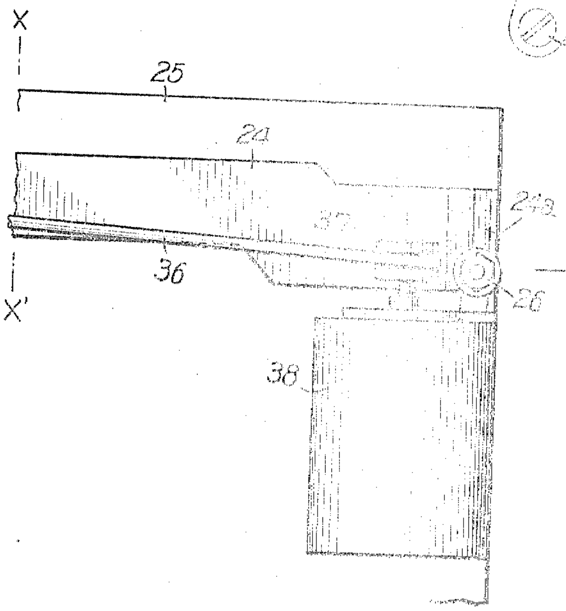
Figures 8, 10:
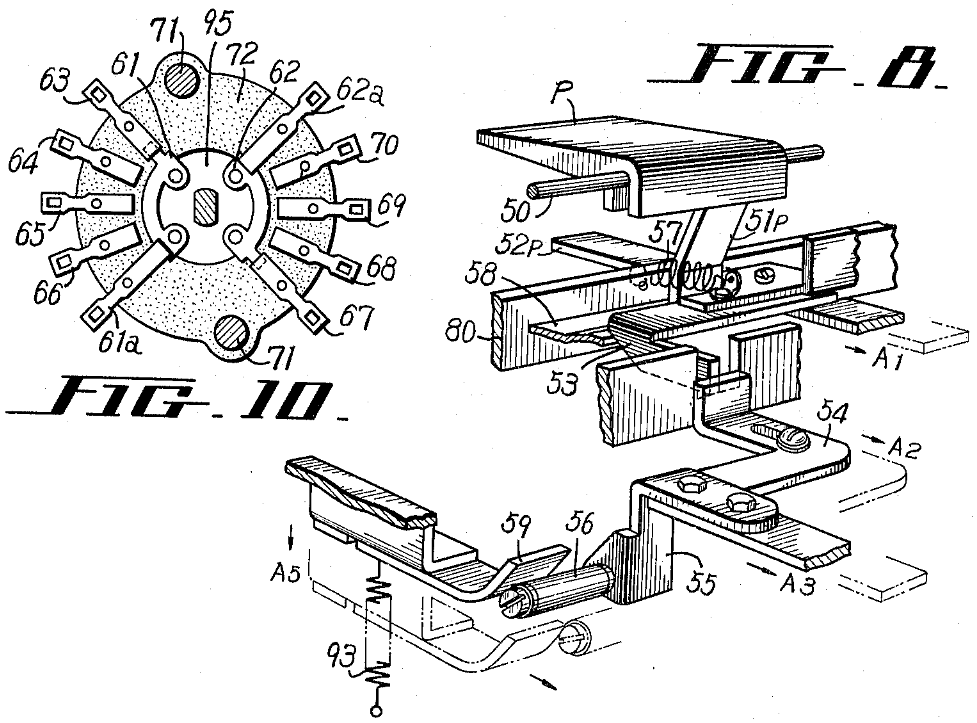
Figures 6, 11:
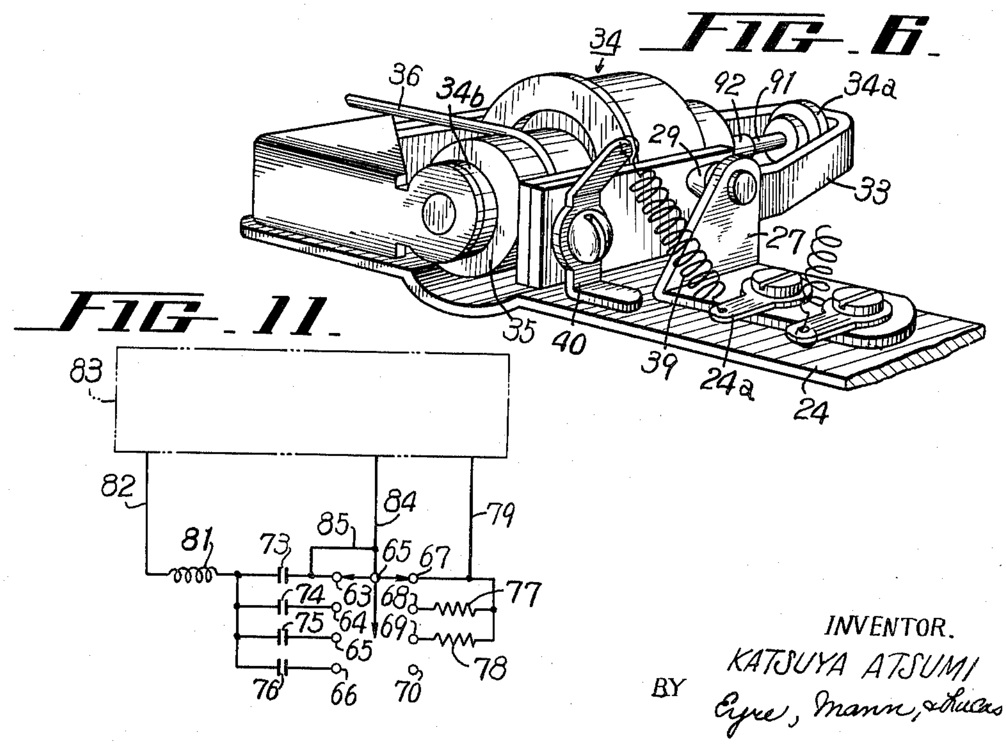
Figures 7A, 7B:
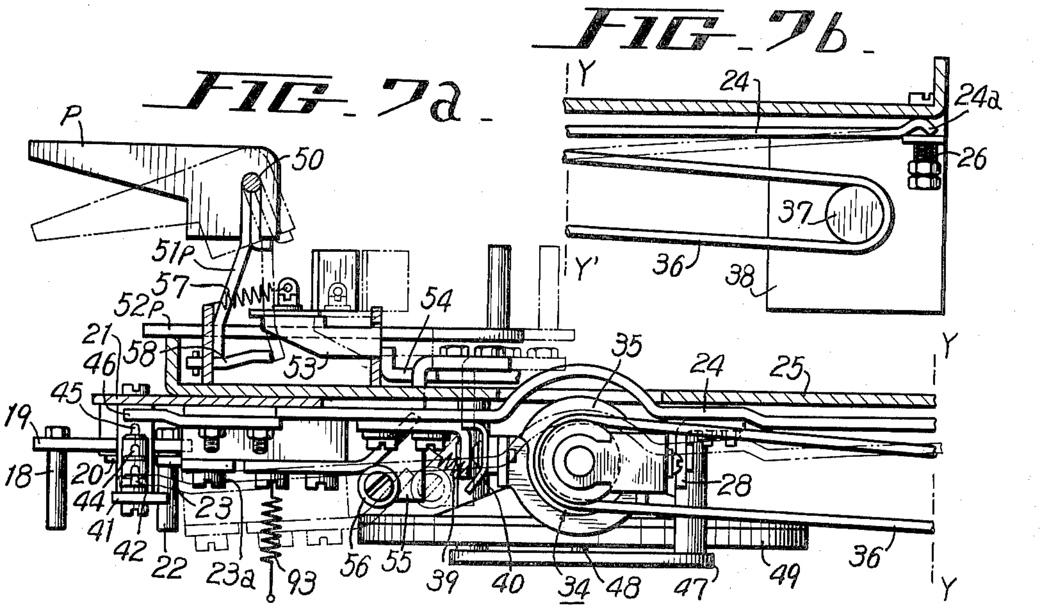
Figure 9:
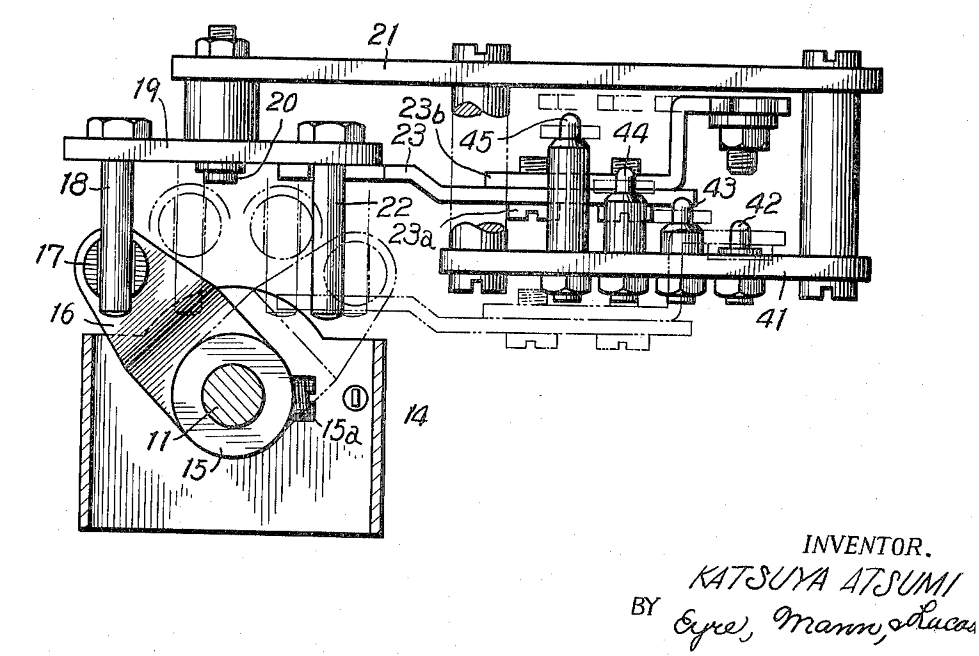

FIG. 5, conveniently divided into FIGS. 5*a* and 5*b*, is an inverted plan view of main operating parts of the speed change mechanism;

FIG. 6 is a perspective view of a stepped cone wheel assembly and its supporting parts employed in the mechanism shown in FIG. 5;

FIG. 7, conveniently divided into FIGS. 7*a* and 7*b*, is a side view of the mechanism shown in FIG. 5 with several parts illustrated in section;

FIG. 8 is a perspective view of a further button and its several related parts of the said button series, destined for controlling the playing service of the tape recorder;

FIG. 9 is a front view, yet fragmentally sectioned, of a mechanism for positioning and locking one end of a pivotally mounted support bar which mounts the stepped cone wheel assembly shown in FIGS. 5–6 and is acted upon by a linkage operatively connected with the selector knob shown in FIG. 3;

FIG. 10 is a rotary switch mounted fixedly on the shaft of the said knob for controlling the elements of an equalizer circuit; and FIG. 11 is a wiring diagram of the equalizer circuit.

Referring now to the accompanying drawings, especially FIGS. 2 and 3 thereof, 10 denotes a front wall of the conventional chassis of a tape recorder which wall mounts fixedly a support frame 14 shaped susbtantially in a channel in its horizontal configuration. A shaft 11 is mounted rotatably in the wall 10 and frame 14 and mounts fixedly in turn at its one end a selector knob 12. The present embodiment is designed for the four speed drive as shown by numerals $1\frac{5}{16}''$, $1\frac{7}{8}''$, $3\frac{3}{4}''$ and $7\frac{1}{2}''$, FIG. 2, which represent various selective tape speeds per minute by way of example.

Knob shaft 11 is provided with a conventional stepping positioner comprising movable and stationary recesses cooperating therewith, as partly seen from FIG. 2. It is believed that such positioning mechanism is commonly known to those skilled in the art so that no more detailed description of this mechanism would be necessary for understanding the invention. If necessary, this ball-and-recess-positioner may be replaced by a ratchet mechanism or any other known similar device.

A collar 15 is fixedly attached to the knob shaft by means of a set screw 15*a* (FIG. 9) and provided with a radial arm 16 which mounts rotatably at its free end a guide 17 having an open guide slot 17*a* kept in loose engagement with a pin 18. Although this pin is shown only in its cross-section in FIG. 2, it is clearly seen comletely from FIG. 9.

The pin 18 is fixedly attached to one end of a rocker plate 19 which is pivotally mounted at its center on a pivot 20 fixed to a stationary wall 21, a part of the said chassis (FIG. 9). A similar pin 22 is provided fixedly on the opposite end of plate 19, which depends as shown from the plate and which is kept in loose engagement with the laterally projecting fork end of an elongated arm 23 as clearly seen from FIG. 5, while the opposite end of the arm is rigidly connected by means of fixing screws 23*a* to a connecting bar 23*b* which is in turn rigidly fixed on the free end of an elongated support bar 24.

As clearly seen from FIG. 7, bar 24 is bent up at its rear end 24*a* so as to form a semi-cylindrical portion, and pivoted as at 26 to the lower surface of a horizontal panel 25 of the chassis. Thus, bar 24 is capable of performing a pivotal motion about its pivot 26 both horizontally and vertically. A pair of depending brackets 27 and 28 (FIG. 5) is fixedly mounted on the lower surface of bar 24, and pins 31 and 32 pivotally carrying a frame 35 are borne in bearings 29 and 30 rigidly supported on the brackets. The frame 35 mounts rotatably in turn a stepped cone wheel assembly 34 by means of bearings 34*a* which are provided in a line perpendicular to an imaginary line passing through the axes of bearings 29 and 30. Thus, the frame together with the wheel assembly is pivotable in a plane perpendicular to the drawing plane of FIG. 5. The wheel assembly represents as shown four steps in correspondence to the four speed mechanism as hereinbefore referred to in connection with FIG. 3.

The stepped wheel 34 is fixedly attached to a driven pulley 35 which is drivingly connected through a belt 36 to a drive pulley 37 direct-coupled with a drive motor 38. This motor is fixedly mounted on the lower surface of panel 25 in the neighborhood of the aforementioned pivot 26 as clearly seen in FIG. 7.

Frame 35 is urged around the aforementioned imaginary line towards the bar 24 by means of a tension spring 39 which is tensioned between a first stop 40 on frame 33 and a second stop 24*a* on the bar 24. The opposite end of the first stop is bent outwardly as shown in FIG. 6 and normally abuts against the bar so as to limit the movable range of frame 33 in the clockwise direction when seen in FIG. 7.

As seen from FIGS. 5, 7 and 9, a front part 21 of the chassis is formed with a small frame 41 in which four positioning pins 42, 43, 44 and 45 are arranged in line and preferably at a constant mutual distance. These pins 42–45 have successively increased heights and reduced upper ends. Bar 24 is formed at its free end with a second fork 46 which is so shaped and arranged to engage the reduced end of any selected one of the pins 42–45 as will be described more in detail hereinafter. The second fork may be kept in a higher level in which it is completely separated from the engaging position as shown by the several imaginary lines in FIG. 9. The heights of positioners 42–45 are selected to be in correspondence with the radii of the four stepped wheel elements of the assembly 34.

A driven wheel 49, which is shown only schematically in FIG. 5 by a circle of chain-dotted line for simplicity of the drawing, has a considerable mass for acting simultaneously as a flywheel and is rotatably mounted by a capstan spindle 48 in a conventional flywheel bracket 47 by a couple of elongated screws 47*a* which are studded to the chassis in conventional manner although the detailed construction is omitted from the drawing for simplicity. The wheel 49 is so arranged that it may be brought into driving engagement with any selected one of stepped wheels of the assembly 34.

Referring to FIGS. 1, 5 and 8, a push button P for initiating the playing operation of the tape recorder is mounted pivotally on an elongated stationary rod 50 which is fixed at its both ends to a small rectangular frame 80 fixedly mounted on panel 25. As shown in FIG. 8, button P is provided with a stem 51 linked at its intermediate portion to a slide 52. When the button is depressed to its lower position as shown by a broken line in FIG. 8, the slide 52 which is properly guided by the frame 80 (see FIG. 1) is moved in the direction shown by arrow A1 to its forward position shown by an imaginary line near the arrow. A connecting member 53 connects the slide 52 rigidly with an angle bar 54 which is in turn fixed rigidly with an actuator 55 having a free rotatable roller 56. Button P is urged by a spring 57*a* to rotate about rod 50 in the clockwise direction when seen in FIG. 7. When the button P is depressed against the action of spring 57*a*, the forked lower end of stem 51 slides over an elongated stop 58 spring-loaded as at 58*a* (FIG. 4) and is locked at its depressed position by abutting resiliently against the front edge of the stop as shown by an imaginary line in FIG. 7. Upon the depression of button P, connecting member 53, angle bar 54, and actuator 55 are simultaneously advanced a predetermined distance in the direction of arrows A2 and A3.

The support bar 24 is provided at its free end with a bent-up follower 59. When the tape drive of the machine is kept at rest, the bar occupies its lower position as shown by chain-dotted lines in FIG. 8 under the action of gravity and/or a spring 63 acting in the direction of arrow A5.

For this purpose, the spring 63 is connected at its upper end with bar 24 as shown and at its lower end with the chassis of the machine although not shown. In this case, the fork 46 of bar 24 is kept in locked engagement with any preselected one of positioning pins 42–45. This locking position of the bar 24 may be varied at will of an operator by manipulating the knob 12, as will be described hereinbelow.

In the next position from the said button P when seen from right to left in FIG. 1, a stop control button S is provided. When this button is depressed as shown by a broken line in FIG. 4, the stem 51*s* of the button acts upon stop 58 so as to rotate in the counter-clockwise direction in FIG. 4 so that the play control button P is released from its locked position and will thus return to its normal position under the action of spring 57. Then, the connecting mechanism 52–54 and actuator 55–56 operatively connected as described hereinbefore with the button P are also returned to their normal position shown by full lines in FIG. 8. The actuator 55 moves the follower 59 upward by the engagement of roller 56 with the latter, whereby the support bar 24 is pivoted vertically about its pivot 26 so as to occupy its upper position shown in full line in FIG. 8, thus being completely separated from positioning pins 42–45. With thus released support bar 24, the operator may manipulate the knob 12 so as to select a suitable one of the standardized four tape speeds.

Turning now to FIG. 1, F denotes a fast forward push button; R a recording button; W a rewinding button. All buttons F, P, S, R and W are arranged in a row, the arrangement of which is rather conventional. If necessary, the button R and its related mechanism may be constructed in the similar way as described hereinbefore in connection with button P, although the details of that construction have been omitted for avoiding duplication.

Knob shaft 11 is further provided with a rotary switch 60 having a rotary disc 65 which is fixedly mounted on the knob shaft and carries thereon two segment contacts 61 and 63 as shown in FIG. 10. Concentrically with the disc, there is provided a stationary ring 72 which is adapted to cooperate with the disc and fixedly attached to the frame 14 by means of a couple of fixing bolts 71 (see FIGS. 2 and 10). Rotary disc 65 is provided thereon with a pair of slide contacts 61 and 62 having radial arms 61*a* and 62*a*, respectively, while the ring 72 is attached fixedly with two groups of radially projecting stationary contacts 63–66 and 67–70. Stationary contacts 63–66 are connected to condensers 73–76, respectively, in parallel and then through a coil 81 and lead 82 to a suitable point of a conventional equalizer circuit 83 which is shown only schematically by a single phantom block 83 while other stationary contacts 67–69 are connected in parallel with each other to a lead 79 which is connected to a further suitable point of the equalizer.

This parallel circuit contains, as shown, two separate resistors 77 and 78. The movable contacts 61 and 62 are connected through a lead 84 to a still further point of the equalizer in conventional manner which lead is however connected to one of the condensers, for instance 73, by means of a branch lead 85.

The operation of the aforementioned arrangement is as follows:

When it is desired to select out a suitable one of the four tape speeds, the stop or reset button S is kept at its raised normal position shown in several figures with full lines.

Since the knob 12 is rotatable under these conditions, the operator may manipulate it so as to turn it, for instance, in the clockwise direction when seen in FIG. 3. Now assume that this manipulation has been carried into effect in such way that an identifying mark 60 on the knob is brought into registration with speed mark $15/16''$, or more specifically the first speed step. The thus selected position of the knob is positively and accurately held by the provision of the stepping positioner 13.

During the aforementioned manipulation of knob 12, rotation is transmitted from knob shaft 11 through the transmission mechanism comprising collar 15, arm 16, guide 17, pin 18, rocker 19 and pin 22 to fork 23 which mechanism thereby will transform the rotary motion of the knob shaft into a rectilinear motion. In this case, the fork 23 is slightly shifted leftwards when seen in FIG. 9.

By the above-mentioned operation of the transmission mechanism, the fork 46 attached to the free end of support bar 24 is brought into a position directly above the shortest positioning pin 42 ready for engagement therewith. This position of the fork is shown by full lines in FIG. 9. It will be noted that by the aforementioned manipulation of knob 12, support bar 24 has been pivoted about its pivot 26 horizontally and in the counter-clockwise direction when seen in FIG. 5. As above mentioned, the shifted angle of the bar and the shifted distance of its related fork 46 is a small value.

At this point, when the operator depresses the playing button P, the several parts of the transmission mechanism are caused to advance a predetermined distance in the direction of arrows A1–5 as described in detail hereinbefore. The support bar 24 is released from its engagement with roller 56 and drawn downwards under the influence of gravity and preferably by the assistance of spring 63. Thus, the bar 24 is caused to swivel about its bent-up end 24*a* vertically in the counter-clockwise direction in FIG. 7 so as to occupy the lowest position shown by broken lines in the figures.

At the same time, the rotary disc 60 of switch 65 is rotated correspondingly so that movable contacts arms 61*a* and 62*a* are brought into contact with stationary contacts 66 and 67, respectively, whereby condenser 73 which has a properly predetermined capacitance adapted for the first stage tape speed 15/16" is included in the equalizer circuit 82.

During the first stage of the above-described knob manipulation, the cone wheel assembly 34 and the support bar 24 therefor occupy naturally their upper position shown in FIG. 7 so that all of wheel elements of the assembly 34 are completely isolated physically from the driven wheel 49. Although wheel assembly 34 together with its mounting frame 33 is arranged pivotally relative to bar 24 as was referred to and the wheel assembly is urged to swivel towards the bar under the action of spring 39, the bar is positioned in this case in its upper position, and stop 40 prevents positively the assembly from contacting with driven wheel 49 so that by turning the knob 12 the bar may be shifted horizontally without any hindrance as already described for making a preparatory operation for the desired tape speed change.

When the preparatory operation has been completed and the related parts have been set to position for obtaining a desired tape speed, the playing button P is depressed and the forked end of bar 24 is brought into contact with the shortest pin 42 in the way as described hereinbefore, whereby the smallest wheel element 61 is brought into driving engagement with driven wheel 49. More specifically, the element 61 is first brought into pressure engagement with wheel 49 and further lowering movement of bar 24 will tension the urging spring 39, whereby the pressure engagement of wheel element 61 with the driven wheel is assured.

When playing button P is released from contact with the operator's finger, thus returning to its normal position, a switch (not shown) kept in mechanical cooperation with the button is hereby closed and the drive motor 38 is energized for rotation. Thus, rotation is transmitted from the motor through pulley 37, belt 36 and pulley 35 to the wheel assembly 34 the first stage 61 of which drives thus the driven wheel 49. It will be understood that the wheel 49 now rotates at a predetermined lowest speed for driving the tape (not shown) at a speed of 15/16" per minute, and that the equalizer 82 will operate at an optimum condition for compensating the present lowest tape speed as already described.

When it is desired to stop the tape drive from these operating conditions, stop button S is depressed, the aforementioned switch is again opened and the motor 38 is deenergized. At the same time, playing button is released from its locked condition as already mentioned and the related tape drive mechanism is reset to its rest position under the action of spring 57.

Further, when it is wanted to operate the machine at second stage speed of 1⅞", knob 12 is turned so as to bring its indicating mark into registration with the figure, whereby the aforementioned operation of the transmitting mechanism will take place, yet with the fork 46 brought to a ready position directly above the second positioning pin 45. Upon the depression of stop button S, the locking engagement of the fork with the second pin will be accomplished. Thus, second stage wheel element 62 of the assembly 34 is now brought into driving engagement with the driven wheel, so as to provide a second higher tape speed of 1⅞". In this case, switch 60 is also rotated so as to bring movable arms 61*a* and 62*a* into conducting engagement with stationary contacts 65 and 68, thus condenser 74 and resistor 77 are included in the equalizer for providing an optimum frequency characteristic to the machine.

After resetting the mechanism by depression of stop button S, the knob 12 is turned to the third figure 3¾" and button P is depressed for initiating the energization of motor 38 and for establishment of locking engagement of fork 46 with third positioning pin 44 when the third stage tape speed is to be selected out. In this case, third wheel element 63 of the assembly 34 is brought into driving engagement with disc 49. In this case, simultaneous rotation of rotary disc 65 of switch 60 with knob 12 will establish a circuit including condenser 75 and resistor 78 suitable for the third stage tape speed.

By turning the knob 12 to its fourth position denoted by 7¾", the desired speed can be equally established and the equalizer may include condenser 76 together with coil 81 which is commonly employed for all of the said four speeds although not mentioned in the foregoing.

If the machine is designed for a multi-channel recording and reproducing, simultaneous recording and reproducing operations may be carried into effect with use of different tape channels. In this case, the whole mechanism must be somewhat modified so as to provide such possibility for effecting both operations simultaneously by the depression of

What is claimed is:

1. In a tape speed change mechanism of a magnetic tape recorder the improvement comprising a chassis, a drive motor mounted thereon, a pivotable cone wheel mounted on a three-dimensionally rockable bar which is in turn pivoted on said chassis, said motor being drivingly connected with said wheel for driving the latter and a driven wheel fixedly mounted on a conventional capstan spindle rotatably mounted in said chassis for tape drive use, said cone wheel having a plurality of steps for selectively engaging with said driven wheel for driving the latter, a knob rotatably mounted on said chassis, transmission means mechanically connected to said knob and transmitting the rotational movement of said knob and transforming said movement into a rectilinear motion, said bar being linked to said transmission means for receiving motion therefrom, a plurality of positioning pins fixedly positioned on said chassis and having different heights from each other for selectively positioning the free end of said bar depending upon the rotated position of said knob, and a playing push button mounted pivotally on said chassis and adapted to bring said free end of said bar from a non-operative and horizontally shiftable position into an engaging position with any selected one of said pins.

2. In a tape speed change mechanism of a magnetic tape recorder the improvement comprising a chassis, a drive motor mounted thereon, a pivotable cone wheel mounted on a three dimensionally rockable bar which is in turn pivoted on said chassis, said motor being drivingly connected with said wheel for driving the latter and a driven wheel fixedly mounted on a conventional capstan spindle rotatably mounted in said chassis for tape driven use, said cone wheel having a plurality of steps for selectively engaging with said driven wheel for driving the latter, a knob rotatably mounted on said chassis, transmission means mechanically connected to said knob and transmitting the rotational movement of said knob and transforming said movement into a rectilinear motion, said transmission bar being linked to said means for receiving motion therefrom, a plurality of positioning pins fixedly positioned on said chassis and having different heights from each other for selectively positioning the free end of said bar depending upon the rotated position of said knob, a playing push button mounted pivotally on said chassis and adapted to bring said free end of said bar from a non-operative and horizontally shiftable position into an engaging position with any selected one of said pins, and a stop push button mounted pivotally on said chassis and mechanically related with said playing button for returning the latter from its operating to non-operating position and resetting simultaneously its related mechanical members upon the depression of said stop button.

3. In a tape speed change mechanism of a magnetic tape recorder the improvement comprising a chassis, a drive motor mounted thereon, a pivotable cone wheel mounted on a three-dimensionally rockable bar which is in turn pivoted on said chassis, said motor being drivingly connected with said wheel for driving the latter and a driven wheel fixedly mounted on a conventional capstan spindle rotatably mounted in said chassis for tape drive use, said cone wheel having a plurality of steps for selectively engaging with said driven wheel for driving the latter, a knob rotatably mounted on said chassis, transmission means mechanically connected with said knob and transmitting the rotational movement of said knob and transforming said movement into a rectilinear motion, said transmisison bar being linked to said means for receiving motion therefrom, a plurality of positioning pins fixedly positioned on said chassis and having different heights from each other for selectvely positioning the free end of said bar depending upon the rotated position of said knob, a playing push button mounted pivotally on said chassis and adapted to bring said free end of said bar from a non-operative and horizontally shiftable position into an engaging position with any selected one of said pins, and a stop push button mounted pivotally on said chassis and mechanically related with said playing button for returning the latter from its operating to non-operating position and resetting simultaneously its related mechanical members upon the depression of said stop button, wherein said motor is energized upon the depression of said playing button and de-energized upon the depression of said stop button.

4. Speed change mechanism as set forth in claim 1 wherein a shaft carrying said knob is fitted with a rotary switch which is adapted to control the arrangement of an electric equalizer in its electric connection for obtaining optimum frequency characteristics of said tape recorder.

5. Speed change mechanism as set forth in claim 4 wherein said equalizer comprises a plurality of combinations of condensers and resistors, any one of which selected combinations, as determined by the rotated position of said knob, is adapted to be connected with an amplifier of said tape recorder.

References Cited by the Examiner

UNITED STATES PATENTS 3,138,031 6/1964 Brualdi -------------- 74—190

DON A. WAITE, *Primary Examiner.*